United States Patent [19]
Keller et al.

[11] Patent Number: 5,478,150
[45] Date of Patent: Dec. 26, 1995

[54] DEVICE FOR THE CONTINUOUS MONITORING OF THE CORRECT PROPORTIONING AND MIXING OF AT LEAST TWO FLUIDS

[75] Inventors: Wilhelm A. Keller, Obstgartenweg 9, CH-6402 Merlischachen, Switzerland; Richard J. Wilson, Medford, Mass.

[73] Assignee: Wilhelm A. Keller, Merlischachen, Switzerland

[21] Appl. No.: 186,251

[22] Filed: Jan. 24, 1994

[51] Int. Cl.⁶ .................................................. B01F 5/00
[52] U.S. Cl. ........................... 366/336; 366/142; 366/143
[58] Field of Search .................................. 366/336, 337, 366/338, 339, 142, 143; 138/44; 425/382.4; 222/52, 145

[56] References Cited

U.S. PATENT DOCUMENTS

| | | | |
|---|---|---|---|
| 2,345,554 | 4/1944 | Burdett | 366/337 |
| 2,443,554 | 6/1948 | DeMattia | 425/382.4 |
| 3,376,023 | 4/1968 | Lage | 138/42 |
| 3,938,550 | 2/1976 | Hechler | 137/559 |
| 4,522,504 | 6/1985 | Greverath | 366/338 |
| 4,542,686 | 9/1985 | Bansal | 366/336 |
| 4,711,623 | 12/1987 | Gross | 425/382.4 |
| 4,923,304 | 5/1990 | Jackson | 366/336 |

FOREIGN PATENT DOCUMENTS

| | | | |
|---|---|---|---|
| 289882 | 11/1988 | European Pat. Off. | 366/336 |
| 6014 | 5/1907 | United Kingdom | 366/338 |

*Primary Examiner*—David Scherbel
*Assistant Examiner*—Terrence R. Till
*Attorney, Agent, or Firm*—Marks & Murase

[57] ABSTRACT

The device for the continuous monitoring of the correct proportioning and mixing of at least two fluids comprises a static or dynamic mixing device ending in a nozzle, wherein within the nozzle, the cross-sectional area of the stream or flow after the last mixing element of the static mixing device or at the end of the dynamic mixing device, as seen in the direction of flow, is substantially reduced compared to the cross-sectional area of the mixing part of the mixing device. This reduction is realized either by an internal volume displacing means or by reducing the diameter of the nozzle after the last mixing element of the static mixing device or at the end of the dynamic mixing device, and the nozzle being at a maximum transparency at the point of scanning. Such devices allow a more accurate monitoring since the greatest possible part of the stream of the mixed material can be more easily viewed or sensed.

13 Claims, 4 Drawing Sheets

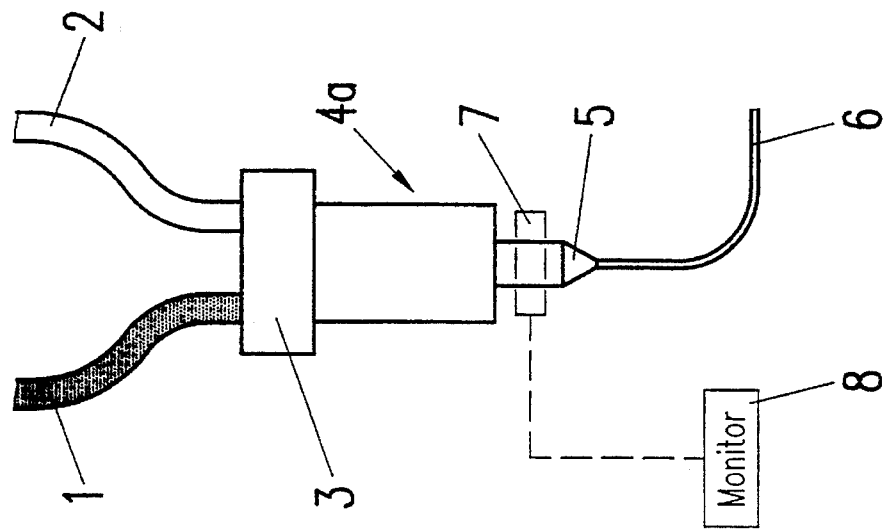
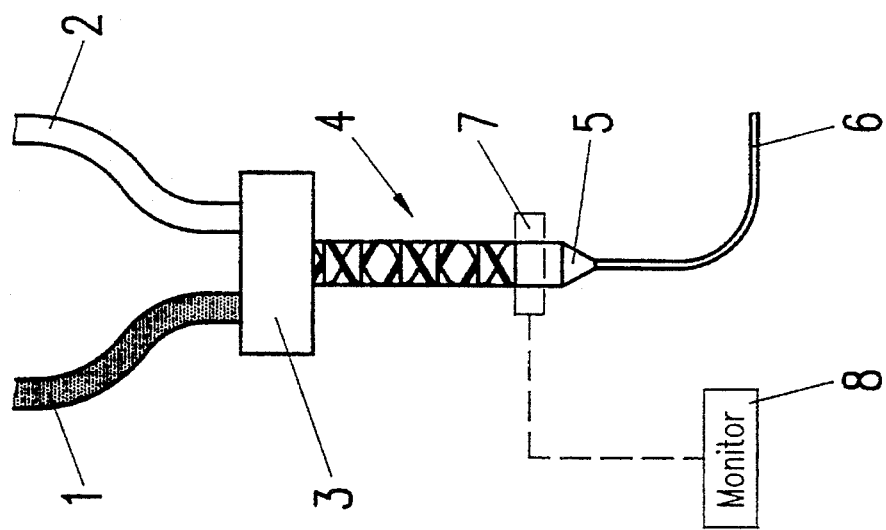

DEVICE FOR THE CONTINUOUS MONITORING OF THE CORRECT PROPORTIONING AND MIXING OF AT LEAST TWO FLUIDS

BACKGROUND OF THE INVENTION

The present invention refers to a device which enables the continuous monitoring of the correct proportioning and/or adequate mixing of at least two fluids within the cross-sectional area of a stream or flow.

In the field of multi-component reactive liquid systems such as used in adhesives, sealants, coating and bonding materials, there is a need to ensure that the equipment which proportions, mixes and dispenses such products, not only maintains correct proportioning of the two or more liquids relative to each other, but also maintains adequate mixing of the product. State of the art technology exists which allows continuous monitoring of part of a stream of a product as it leaves a static or dynamic mixer within equipment and is capable of providing a signal if the proportioning or mixing is outside of a limit. However, the accuracy of such monitoring requires to be as refined as possible.

SUMMARY OF THE INVENTION

It is the special purpose of this invention to considerably improve the accuracy for the continuous monitoring of the stream as it leaves a static or dynamic mixer. It is understood that the sensing probe and the ratio-monitor per se are state of the art and not part of this invention. The purpose is achieved with a device for the continuous monitoring of the correct proportioning and mixing of at least two fluids, comprising a static or a dynamic mixing device ending in a nozzle, wherein the cross-sectional area of the stream or flow within the nozzle after the last mixing element of the static mixing device or at the end of the dynamic mixing device is, as seen in the direction of flow, substantially reduced compared to the cross-sectional area of the mixing part of the mixing device, this reduction being realized either by an internal volume displacing means or by reducing the diameter of the nozzle after the last mixing element of the static mixing device or at the end of the dynamic mixing device, and wherein at least the portion of the nozzle at the place of the sensing device is at a maximum transparency to media used for scanning the stream.

BRIEF DESCRIPTION OF THE DRAWINGS

The invention is explained in more detail hereinafter with reference to a drawing of embodiments.

FIG. 1 shows schematically the principle of monitoring with a sensing probe situated after a static mixer, FIG. 2 shows schematically the principle of monitoring with a sensing probe situated after a dynamic mixer.

DETAILED DESCRIPTION OF THE INVENTION

Figure 3:
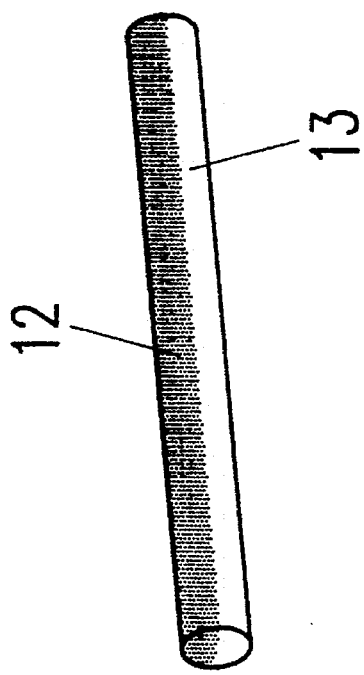
FIGS. 3 to 6 show different conditions of two different fluids.

FIGS. 1 and 2 each show a typical point within an equipment system of the prior art, whereby two separate liquid components 1 and 2 enter a ported block 3 and flow under pressure through a static mixing tube 4 or a dynamic mixing device 4a and out of an outlet 5 in the form of a bead 6 passing a sensing probe 7, connected to a ratio monitor 8. The chemical 1 is shown as black and the chemical 2 is shown as white.

FIG. 3 shows a bead of the chemical product after it has left the nozzle of the mixing device 4 or 4a and numeral 9 indicates a correctly mixed grey material at the surface as is also shown at 11 but a variation is shown at 10. This variation may arise through a lack of proper mixing at that point in the flow or it may be a lack of one component in the correct proportion at that point in the flow.

Figure 4:
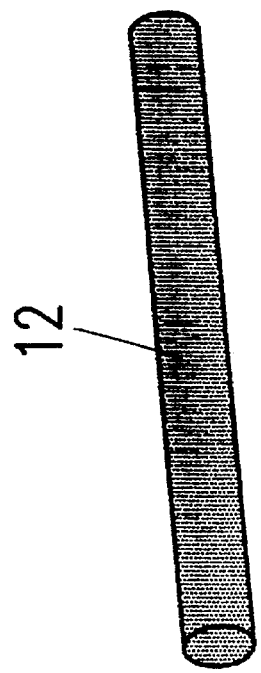

FIG. 4 shows the black 12 and the white 13 component in what may be the correct proportion relative to each other but unmixed.

Figure 5:
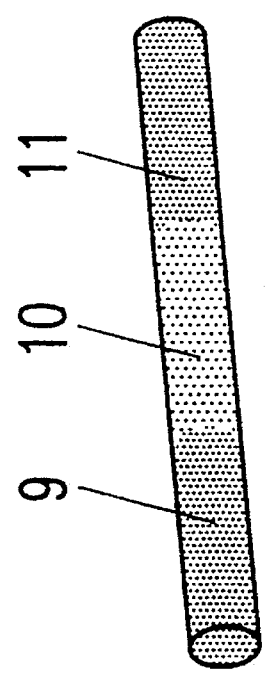
Figure 6:
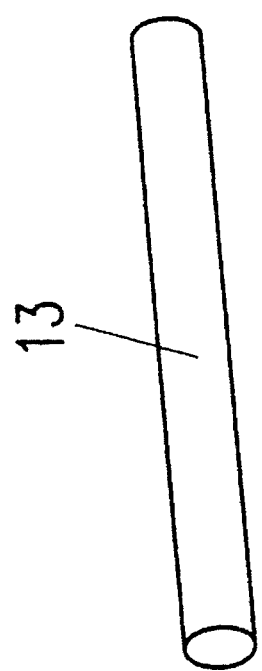

FIG. 5 shows the white component only and FIG. 6 the black component only.

From the above it is important to appreciate that two or more chemicals can be:

a) Unmixed partially or totally b) Out of the correct proportion to each other partially or totally; or c) Out of synchronisation and therefore out of proportion with each other at the beginning or end of flow.

For this reason it is not only necessary to check the chemical mix and proportion around the circumference of the stream, but it is preferable to check as much of the cross-sectional area of the stream as is possible.

For this purpose, a device is proposed which reads a color density and/or a material density within and close to the end of the nozzle, such that the pressure is close to a minimum just before it is dispensed, thus enabling the use of a thinner nozzle wall.

In order to monitor the inside of the stream to a maximum degree, FIGS. 7–9 and FIGS. 10 and 11 show two possible solutions, one solution with a volume displacing insert, and the other solution with a substantially reduced diameter at the place of monitoring.

Figure 7:
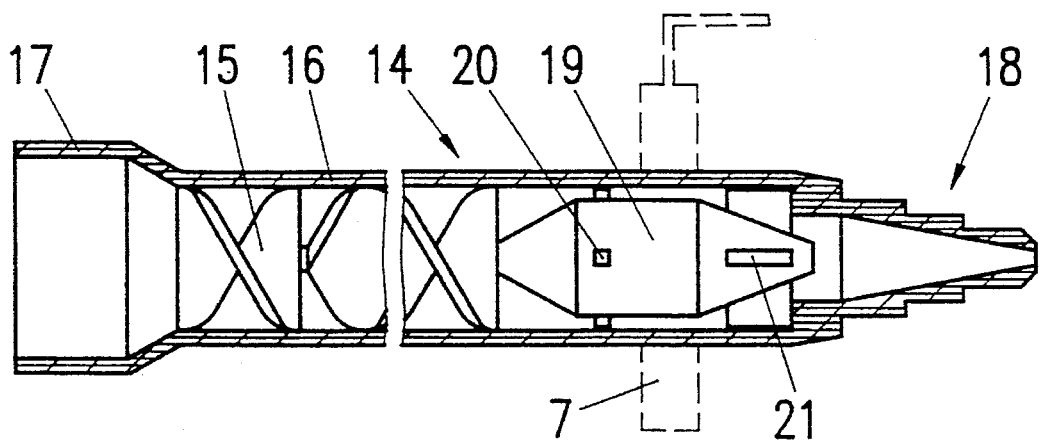
FIGS. 7 to 9 show a section of three different embodiments of a device incorporating a volume displacing insert at the place of measurement.

FIG. 7 shows a state of the art static mixer 14 which is connectable to the ported block 3 of FIG. 1 or similar device via adapter 17 and comprises mixing elements 15 contained in a mixer body 16 and a nozzle 18. In the embodiment of FIG. 7, the sensing probe 7 is situated after the last mixing element, and therefore at least this part of the tube should be preferably transparent or as thin as possible to enable adequate scanning and/or measurements for determining and monitoring the colour and/or material density. Generally it is advantageous to produce the whole tube of transparent material, whereby the transparency relates to a method of measurement which may be optical, ultrasound or of other principles.

In order to scan and monitor the greatest possible detail within a cross-sectional area of a stream, a volume displacing insert 19, having the shape of a torpedo for low flow resistance and a diameter less than the internal diameter of the mixer body 16, is inserted in the tube after the last mixing element. It follows from FIG. 7 that the stream of material is therefore formed into a relatively thinner cross-section which can be sensed more thoroughly.

The volume displacing insert 19 comprises a first series of ribs 20 for positioning and a second series of ribs 21 for positioning and supporting the volume displacing insert within the housing of the mixer and thus enabling the stream to pass by.

Figure 8:
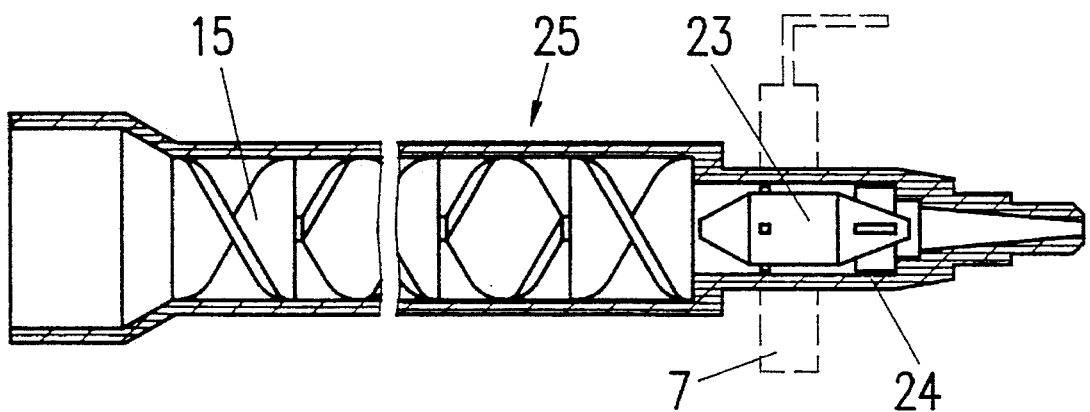

FIG. 8 shows a variant to the embodiment of FIG. 7 in that a smaller volume displacing insert 23 is located inside a reduced nozzle section 24 of the mixer 25.

Figure 9:
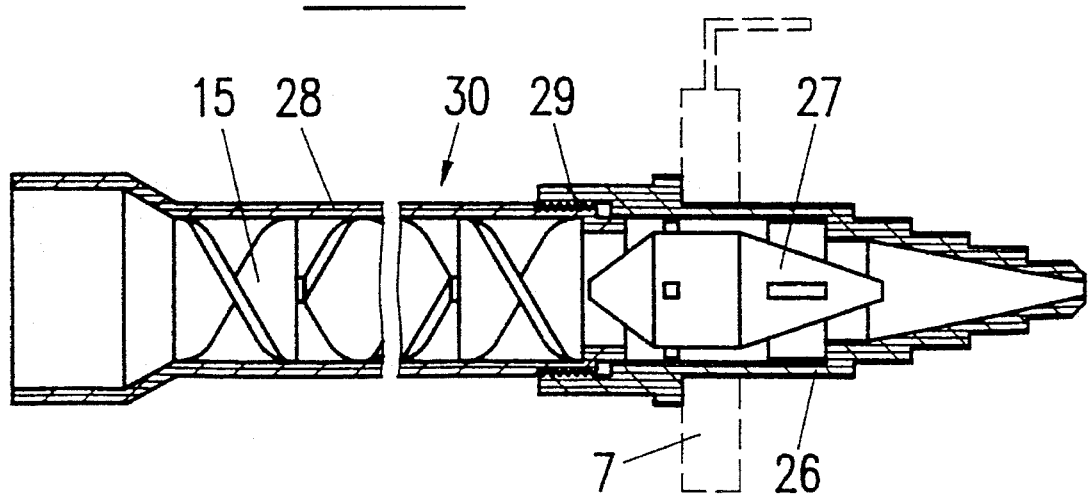

FIG. 9 shows another embodiment in which the nozzle 26, containing the volume displacing insert 27, is attached to the mixer body 28 either by a 'snap-on' means or by a thread 29 on the mixer body 30.

Figure 10:
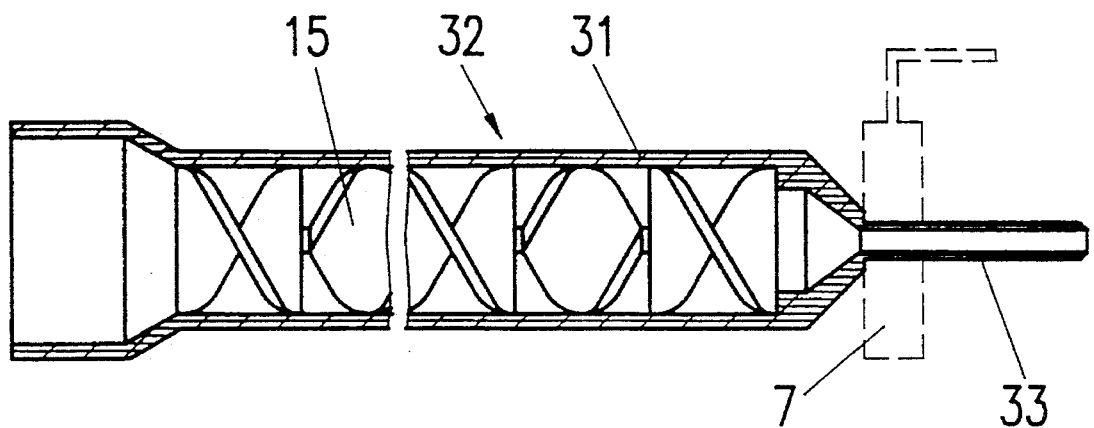
FIGS. 10 and 11 show a section of two different embodiments of a device having a substantially reduced section at the place of measurement.
Figure 11:
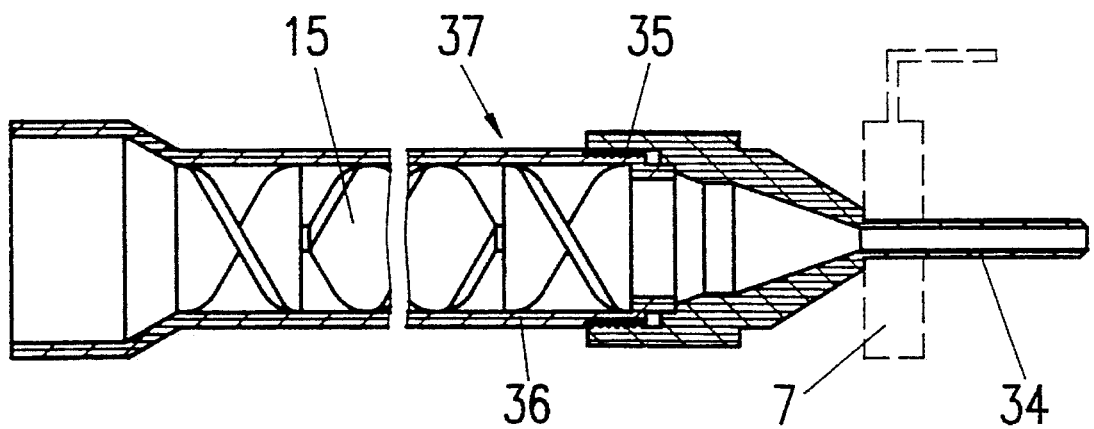

FIGS. 10 and 11 show other means for improving the accuracy of results. The mixer body 31 of mixer 32 containing the mixing elements 16 are the same as previous. The nozzle 33, however, is different in that it is reduced in diameter to an absolute minimum.

FIG. 11 shows a variation of FIG. 10 whereby a nozzle 34 can be attached by a "snap-on" means or a thread 35 to the housing 36 of mixer 37.

It is understood that the same principles of a nozzle with a reduced cross-sectional area or small diameter stream color density and/or material density reading area, also apply for dispensing nozzles attached to a dynamic mixing device as shown in FIG. 2.

We claim:

1. A device for continuously monitoring a proportioning and mixing of at least two fluids, comprising:

a static mixing device having a mixing part with a plurality of mixing elements for mixing said at least two fluids and a nozzle in fluid communication with said mixing part, said nozzle having a means for defining a first cross-sectional area of a flow of said fluids after the fluids flow through a last one of the mixing elements of said mixing device, said first cross-sectional area being substantially reduced as compared to a second cross-sectional area of the flow of said fluids through the mixing part of the mixing device;

said means for defining the first cross-sectional area comprising an internal volume displacing means positioned within the nozzle after the last mixing element; and a sensing device for scanning the fluid flowing through said first cross-sectional area.

2. A monitoring device according to claim 1, wherein said volume displacing means has the shape of a torpedo comprising a plurality of ribs for positioning and supporting said volume displacing means.

3. A monitoring device according to claim 2, wherein said plurality of ribs comprises a first series of ribs for positioning and a second series of ribs for positioning and supporting said volume displacing means.

4. A monitoring device according to claim 1, wherein said nozzle containing said volume displacing means is attachable to a housing of the mixing device.

5. A monitoring device according to claim 1, wherein a diameter of the nozzle downstream of the mixing part of the mixing device is reduced as compared to a diameter of the mixing part of the mixing device.

6. A monitoring device according to claim 5, wherein the nozzle is attachable to a housing of the mixing device.

7. A monitoring device according to claim 1, wherein at least a portion of the nozzle is transparent to a sensing media used by said sensing device.

8. A device for monitoring a flow of at least two fluids, comprising:

a mixing device having a plurality of mixing elements and a nozzle in downstream fluid communication with said mixing elements, said nozzle having an internal volume displacing means for defining a first cross-sectional area of a flow through said nozzle between an outer peripheral surface of said internal volume displacing means and an inner peripheral surface of said nozzle, said first cross-sectional area being substantially reduced as compared to a second cross-sectional area of a flow through said mixing elements, said internal volume displacing means being positioned and supported within a diameter of the nozzle, at least a portion of said nozzle downstream of said mixing elements being transparent to allow external monitoring of the flow through said first cross-sectional area.

9. A device for monitoring a flow of at least two fluids, comprising:

a mixing device having a plurality of mixing elements and a nozzle in fluid communication with said mixing elements, said nozzle having an internal volume displacing means for defining a first cross-sectional area of a flow through said nozzle, said first cross-sectional area being substantially reduced as compared to a second cross-sectional area of a flow through said mixing elements, said internal volume displacing means being positioned and supported within a diameter of the nozzle, at least a portion of said nozzle being transparent to allow external monitoring of the flow through said first cross-sectional area; and further comprising a sensing means for scanning the fluid flowing through said first cross-sectional area.

10. A monitoring device according to claim 9, wherein said transparent portion of the nozzle is penetrated by a sensing media used by said sensing means.

11. A monitoring device according to claim 8, wherein said mixing device is a static mixing device.

12. A device for monitoring a flow of at least two fluids, comprising:

a mixing device having a plurality of mixing elements and a nozzle in fluid communication with said mixing elements, said nozzle having an internal volume displacing means for defining a first cross-sectional area of a flow through said nozzle, said first cross-sectional area being substantially reduced as compared to a second cross-sectional area of a flow through said mixing elements, said internal volume displacing means being positioned and supported within a diameter of the nozzle, at least a portion of said nozzle being transparent to allow external monitoring of the flow through said first cross-sectional area;

wherein said volume displacing means has the shape of a torpedo and has a plurality of ribs for positioning and supporting said volume displacing means.

13. A device for monitoring a flow of at least two fluids, comprising:

a mixing device having a plurality of mixing elements and a nozzle in fluid communication with said mixing elements, said nozzle having an internal volume displacing means for defining a first cross-sectional area of a flow through said nozzle, said first cross-sectional area being substantially reduced as compared to a second cross-sectional area of a flow through said mixing elements, said internal volume displacing means being positioned and supported within a diameter of the nozzle, at least a portion of said nozzle being transparent to allow external monitoring of the flow through said first cross-sectional area;

wherein said volume displacing means comprises a streamlined member positioned within said nozzle, said first cross-sectional area being defined between an outer diameter of said streamlined member and an inner diameter of said nozzle.

* * * * *